United States Patent
Kennan et al.

(10) Patent No.: US 8,013,097 B2
(45) Date of Patent: Sep. 6, 2011

(54) SILICONE POLYETHER BLOCK COPOLYMERS HAVING ORGANOFUNCTIONAL ENDBLOCKING GROUPS

(75) Inventors: John Kennan, Midland, MI (US); Kevin Lewis, Sanford, MI (US); Fernando Vazquez, Greensboro, NC (US)

(73) Assignee: Dow Corning Corporation, Midland, MI (US)

( * ) Notice: Subject to any disclaimer, the term of this patent is extended or adjusted under 35 U.S.C. 154(b) by 138 days.

(21) Appl. No.: 12/594,649

(22) PCT Filed: Mar. 5, 2008

(86) PCT No.: PCT/US2008/002962
§ 371 (c)(1),
(2), (4) Date: Oct. 5, 2009

(87) PCT Pub. No.: WO2008/127519
PCT Pub. Date: Oct. 23, 2008

(65) Prior Publication Data
US 2010/0048795 A1 Feb. 25, 2010

Related U.S. Application Data

(60) Provisional application No. 60/922,879, filed on Apr. 11, 2007.

(51) Int. Cl.
C08G 77/04 (2006.01)
C08G 77/42 (2006.01)
C08F 283/12 (2006.01)

(52) U.S. Cl. ............ 528/25; 525/474; 525/476

(58) Field of Classification Search .......... None
See application file for complete search history.

(56) References Cited

U.S. PATENT DOCUMENTS

| | | | |
|---|---|---|---|
| 3,046,250 A * | 7/1962 | Plneddemann ............... | 528/28 |
| 3,389,160 A | 6/1968 | Wallace | |
| 3,419,593 A | 12/1968 | Willing | |
| 3,655,420 A | 4/1972 | Tichenor | |
| 3,715,334 A | 2/1973 | Karstedt | |
| 3,814,730 A | 6/1974 | Karstedt | |
| 3,923,705 A | 12/1975 | Smith | |
| 4,122,029 A | 10/1978 | Gee et al. | |
| 4,184,004 A * | 1/1980 | Pines et al. ............... | 442/102 |
| 4,185,087 A * | 1/1980 | Morlino ............... | 510/122 |
| 4,359,545 A | 11/1982 | Ona et al. | |
| 4,390,650 A | 6/1983 | Deiner et al. | |
| 4,409,267 A | 10/1983 | Ichinohe et al. | |
| 4,680,366 A | 7/1987 | Tanaka et al. | |
| 4,725,635 A | 2/1988 | Okada et al. | |
| 4,757,121 A | 7/1988 | Tanaka et al. | |
| 4,814,095 A | 3/1989 | Puchta et al. | |
| 4,822,681 A | 4/1989 | Schossler et al. | |
| 4,847,154 A * | 7/1989 | Ryang ............... | 428/415 |
| 4,973,643 A * | 11/1990 | O'Lenick, Jr. ............... | 528/15 |
| 5,008,349 A | 4/1991 | Kosal et al. | |
| 5,025,076 A | 6/1991 | Tanaka et al. | |
| 5,098,979 A * | 3/1992 | O'Lenick, Jr. ............... | 528/15 |
| 5,164,522 A * | 11/1992 | McCarthy et al. ............ | 554/39 |
| 5,175,325 A | 12/1992 | Brown et al. | |
| 5,196,499 A * | 3/1993 | O'Lenick, Jr. ............... | 528/15 |
| 5,269,951 A | 12/1993 | McVie et al. | |
| 5,328,685 A | 7/1994 | Janchitraponvej et al. | 424/70.11 |
| 5,387,417 A | 2/1995 | Rentsch | |
| 5,472,686 A * | 12/1995 | Tsubaki et al. ............... | 424/59 |
| 5,486,634 A | 1/1996 | Hahn et al. | |
| 5,539,013 A | 7/1996 | Eckberg et al. | |
| 5,688,889 A | 11/1997 | Canivenc et al. | |
| 5,807,956 A * | 9/1998 | Czech ............... | 528/28 |
| 5,811,487 A | 9/1998 | Schulz, Jr. et al. | |
| 5,981,681 A | 11/1999 | Czech | |
| 6,171,515 B1 | 1/2001 | Evans et al. | |
| 6,187,891 B1 | 2/2001 | Rautschek et al. | |
| 6,197,876 B1 | 3/2001 | Policello et al. | |
| 6,242,554 B1* | 6/2001 | Busch et al. ............... | 528/28 |
| 6,251,313 B1 | 6/2001 | Deubzer et al. | |
| 6,255,429 B1 | 7/2001 | Griffin et al. | |
| 6,407,274 B1 | 6/2002 | Vrckovnik et al. | |
| 6,475,568 B1 | 11/2002 | Czech | |
| 6,482,969 B1 | 11/2002 | Helmrick et al. | |
| 6,730,766 B2 | 5/2004 | Schattenmann et al. | |
| 6,835,419 B2 | 12/2004 | Herzig et al. | |
| 2004/0048996 A1* | 3/2004 | Lange et al. ............... | 528/10 |
| 2004/0083553 A1 | 5/2004 | Chardon et al. | |
| 2004/0087469 A1 | 5/2004 | Carswell | |
| 2004/0225099 A1 | 11/2004 | Hohberg et al. | |
| 2006/0106173 A1 | 5/2006 | Karl et al. | |
| 2006/0128880 A1* | 6/2006 | Sandner et al. ............ | 524/588 |
| 2006/0163524 A1* | 7/2006 | Lange et al. ............... | 252/8.63 |

FOREIGN PATENT DOCUMENTS

| | | |
|---|---|---|
| DE | 1444551 | 3/1963 |
| DE | 3035824 | 5/1982 |
| DE | 3215936 | 11/1983 |
| DE | 4344082 | 12/1994 |
| DE | 19817776 | 10/1999 |
| DE | 10036522 | 2/2002 |
| DE | 10036532 | 2/2002 |
| DE | 10036533 | 2/2002 |
| DE | 10036699 | 2/2002 |
| DE | 10247462 | 4/2004 |
| EP | 0058493 | 6/1985 |
| EP | 0291213 | 4/1987 |
| EP | 0235526 | 9/1987 |
| EP | 0269982 | 6/1988 |
| EP | 0469316 | 2/1992 |
| EP | 0530718 | 3/1993 |
| EP | 0470613 | 4/1995 |
| EP | 0523910 | 11/1996 |
| EP | 0941761 | 9/1999 |
| EP | 1116813 | 7/2001 |
| EP | 1288246 | 3/2003 |
| EP | 1081272 | 10/2004 |
| EP | 1561770 | 8/2005 |
| EP | 1008614 | 7/2006 |

(Continued)

*Primary Examiner* — Robert Loewe
(74) *Attorney, Agent, or Firm* — Alan Zombeck

(57) ABSTRACT

Silicone polyether copolymers are disclosed having the average formula E-B-[AB]$_n$-E where E is an organofunctional endblocking group, B is a diorganopolysiloxane, A is a divalent organic group comprising at least one polyether group, and n is ≧1. The silicone polyether copolymers having an amine functional endblocking group are useful in the treatment of textiles and fibers.

18 Claims, No Drawings

FOREIGN PATENT DOCUMENTS

| | | |
|---|---|---|
| FR | 2865223 | 7/2005 |
| GB | 2378960 | 2/2003 |
| JP | 50048293 | 4/1975 |
| JP | 52096297 | 8/1977 |
| JP | 53006700 | 1/1978 |
| JP | 53090421 | 8/1978 |
| JP | 57171768 | 10/1982 |
| JP | 59179884 | 10/1984 |
| JP | 61296184 | 12/1986 |
| JP | 62041378 | 2/1987 |
| JP | 62276090 | 11/1987 |
| JP | 63075184 | 4/1988 |
| JP | 63212304 | 9/1988 |
| JP | 01221580 | 9/1989 |
| JP | 02154076 | 6/1990 |
| JP | 02216283 | 8/1990 |
| JP | 02284959 | 11/1990 |
| JP | 02311581 | 12/1990 |
| JP | 04011078 | 1/1992 |
| JP | 04011079 | 1/1992 |
| JP | 04011080 | 1/1992 |
| JP | 04057975 | 2/1992 |
| JP | 1992359023 | 12/1992 |
| JP | 03269570 | 11/1993 |
| JP | 09111668 | 4/1997 |
| JP | 09183854 | 7/1997 |
| JP | 2000129577 | 5/2000 |
| JP | 2001146685 | 5/2001 |
| JP | 2001172878 | 6/2001 |
| JP | 2002194675 | 7/2002 |
| JP | 2002194676 | 7/2002 |
| JP | 2002194677 | 7/2002 |
| JP | 2002371476 | 12/2002 |
| JP | 2003119674 | 4/2003 |
| JP | 3602633 | 12/2004 |
| JP | 2005330354 | 12/2005 |
| WO | WO9732917 | 9/1997 |
| WO | WO0049090 | 8/2000 |
| WO | WO0050491 | 8/2000 |
| WO | WO0078844 | 12/2000 |
| WO | WO0127232 | 4/2001 |
| WO | WO0177434 | 10/2001 |
| WO | WO0210255 | 2/2002 |
| WO | WO0210259 | 2/2002 |
| WO | WO02066559 | 8/2002 |
| WO | WO03078504 | 9/2003 |
| WO | WO03085015 | 10/2003 |
| WO | WO03104374 | 12/2003 |
| WO | WO2004016722 | 2/2004 |
| WO | WO2004035635 | 4/2004 |
| WO | WO2004041912 | 5/2004 |
| WO | WO2004042136 | 5/2004 |
| WO | WO2005035628 | 4/2005 |
| WO | WO2005080666 | 9/2005 |
| WO | WO2005103117 | 11/2005 |
| WO | WO2005103215 | 11/2005 |

* cited by examiner

SILICONE POLYETHER BLOCK COPOLYMERS HAVING ORGANOFUNCTIONAL ENDBLOCKING GROUPS

CROSS REFERENCE TO RELATED APPLICATIONS

This application is a U.S. national stage filing under 35 U.S.C. §371 of PCT Application No. PCT/US08/002962 filed on Mar. 5, 2008, currently pending, which claims the benefit of U.S. Provisional Patent Application No. 60/922,879 filed Apr. 11, 2007 under 35 U.S.C. §119 (e). PCT Application No. PCT/US08/002962 and U.S. Provisional Patent Application No. 60/922,879 are hereby incorporated by reference.

TECHNICAL FIELD

This disclosure relates to silicone polyether copolymers having an organofunctional endblocking group, methods of making them, and their use for treating textiles or fibers.

BACKGROUND

Silicones have been used extensively for fiber or textile treatments. In particular, various amine functional silicones have been developed and sold commercially under various tradenames. Common problems associated with amine functional silicones as textile treatments are their yellowing of textiles from the oxidation of the amine groups and extensive hydrophobic nature of the polydimethylsiloxane chains. Thus, efforts over the years have focused on modifying amine functional silicones by adding hydrophilic groups to the siloxane polymers, while altering or reducing the amine content to reduce yellowing. For example, JP09183854, and JP03269570 describe a copolymer prepared by first making a block copolymer from Si—H terminal polydimethylsiloxane and allyl or methallyl terminal polyether, and then equilibrating that copolymer with an aminosiloxane to incorporate the amine functionality.

There are several shortcomings using an equilibration method to incorporate amine functionality into a silicone polyether copolymers. For example, ensuring complete equilibration (randomization of the amine groups) can take a long time, and it is difficult to assess if the amine becomes sufficiently randomized in the copolymer. Furthermore, at low amine concentrations, a significant portion of the polymer chains will have no amine functionality.

The present inventors have discovered certain silicone polyether block copolymers that eliminate some of these disadvantages. The silicone polyether block copolymers may be prepared by hydrosilylating an SiH terminal silicone polyether block copolymer with an epoxy functional olefin such as allyl glycidyl ether or vinyl cyclohexene oxide. Then, the epoxy groups are reacted with an amine to convert the epoxides into beta hydroxy amine groups. Alternately, the epoxy groups may be reacted with tertiary amine salts to convert the epoxides into beta hydroxy quaternary ammonium groups. The advantage of using the hydrosilylation chemistry in conjunction with the amine-epoxide chemistry is that most polymer chains will contain hydrophilic polyether blocks and two amine groups. Furthermore, since the amine groups are at the chain end, it is possible to use a minimal amount of amine to minimize yellowing of fabrics. The amine groups can be further converted to the salt form by addition of acid or converted to their quaternary ammonium forms via the use of common quaternizing agents such as alkyl halides, benzyl halides, alkyl sulfates, aryl sulfates, or chloroacetate esters.

SUMMARY

This invention relates to a silicone polyether copolymer having the average formula;

where E is an organofunctional endblocking group,
B is a diorganopolysiloxane,
A is a divalent organic group comprising at least one polyether group, and
n is $\geq 1$.

In one embodiment, the silicone polyether copolymer has the average formula;

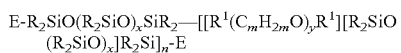

where
x is $\geq 0$, m is from 2 to 4 inclusive, y is $\geq 4$, n is $\geq 1$,
R is independently a monovalent hydrocarbon group containing 1 to 30 carbons,
$R^1$ is a divalent hydrocarbon containing 2 to 30 carbons.
E is an organofunctional endblocking group that may have the formula
$R^4CH_2CH(OH)CH_2OR^2$— where $R^4$ is a monovalent amine functional group,
$R^2$ is a divalent hydrocarbon linking group containing 2 to 6 carbon atoms.

The present disclosure also provides a process for preparing silicone polyether block copolymers having an organofunctional endblocking group.

The present disclosure yet further provides a method of using the silicone polyether copolymers for treatment of textiles or fibers.

DETAILED DESCRIPTION

The present disclosure relates to a silicone polyether copolymer having the average formula;

where E is an organofunctional endblocking group,
B is a diorganopolysiloxane,
A is a divalent organic group comprising at least one polyether group, and
n is $\geq 1$.
The silicone polyether copolymers of the present disclosure are -[AB]$_n$— copolymers having repeating units of A, a divalent organic group containing at least one polyether group, and B, a diorganopolysiloxane. The subscript n represents on average the number repeating units of [AB] in the copolymer, and n is $\geq 1$, alternatively n ranges from 1 to 50. The silicone polyether copolymers of the present disclosure are characterized by having an organofunctional endblocking group, designated as E, and described in more detail below.

The divalent organic group in the silicone polyether copolymers of the present disclosure, designated as A, comprises at least one polyether group. As used herein, "polyether" designates a polyoxyalkylene group. The polyoxyalkylene group may be represented by, although not limited to, the formula $(C_mH_{2m}O)_y$, wherein m is from 2 to 4 inclusive, and y is greater than 4, alternatively y may range from 5 to 60, or alternatively from 5 to 30. The polyoxyalkylene group may comprise oxyethylene units ($C_2H_4O$), oxypropylene units ($C_3H_6O$), oxybutylene units ($C_4H_8O$), or mixtures thereof.

Typically, the polyoxyalkylene group comprises oxyethylene units ($C_2H_4O$) or mixtures of oxyethylene units and oxypropylene units.

The "silicone" group in the silicone polyether copolymers of the present disclosure is a diorganopolysiloxane, designated as B. The diorganopolysiloxane may be a predominately linear siloxane polymer having the formula $(R_2SiO)_x$, wherein R is independently selected from a monovalent hydrocarbon group, x is $\geq 1$, alternatively x may range from 2 to 100, or from 2 to 50. The hydrocarbon groups represented by R in the siloxane polymer are free of aliphatic unsaturation. These organic groups may be independently selected from monovalent hydrocarbon and monovalent halogenated hydrocarbon groups free of aliphatic unsaturation. These monovalent groups may have from 1 to 30 carbon atoms, alternatively 1 to 10 carbon atoms, and are exemplified by, but not limited to alkyl groups such as methyl, ethyl, propyl, butyl, pentyl, hexyl, heptyl, octyl, undecyl, and octadecyl; cycloalkyl such as cyclohexyl; aryl such as phenyl, tolyl, xylyl, benzyl, and 2-phenylethyl; and halogenated hydrocarbon groups such as 3,3,3-trifluoropropyl, 3-chloropropyl, and dichlorophenyl. Typically, the diorganopolysiloxane is a predominately linear polydimethylsiloxane having the formula $(Me_2SiO)_x$, where x is as defined above.

In one embodiment, the silicone polyether copolymer may be represented by the average formula;

$$E-R_2SiO(R_2SiO)_xSiR_2-[[R^1(C_mH_{2m}O)_y R^1][R_2SiO(R_2SiO)_x]R_2Si]_n-E$$

where E is an organofunctional endblocking group,
x is $\geq 0$, m is from 2 to 4 inclusive, y is $\geq 4$, n is $\geq 1$,
R is independently a monovalent hydrocarbon group containing 1 to 30 carbons,
$R^1$ is a divalent hydrocarbon containing 2 to 30 carbons.

At least one end of each polyether block A is linked to an organopolysiloxane block B by a divalent hydrocarbon group, designated $R^1$. This linkage is determined by the reaction employed to prepare the $(AB)_n$ block silicone polyether copolymer. The divalent hydrocarbon group $R^1$ may be independently selected from divalent hydrocarbon groups containing 2 to 30 carbons. Representative, non-limiting examples of such divalent hydrocarbon groups include; ethylene, propylene, butylene, isobutylene, pentylene, hexylene, heptylene, octylene, and the like. Representative, non-limiting examples of such divalent organofunctional hydrocarbons groups include acrylate and methacrylate. Typically, $R^1$ is isobutylene ($-CH_2CH(CH_3)CH_2-$).

In one embodiment, the organofunctional endblocking group E may have the formula $R^4CH_2CH(OH)CH_2OR^2-$ where $R^4$ is a monovalent amine functional group and $R^2$ is a divalent hydrocarbon linking group containing 2 to 6 carbon atoms, such as a divalent alkylene like ethylene, propylene, butylene, isobutylene, pentylene, or hexylene. Typically, $R^2$ is propylene $-CH_2CH_2CH_2-$. The monovalent amine functional group $R^4$ may be any amine functional organic group. The nitrogen atom of the amine functional group is bonded to the methylene group of the $-CH_2CH(OH)CH_2OR^2-$ endblocking group. The amine functional group may be any secondary, tertiary, or quaternary amine, but typically are tertiary amines. The amine functional group may be include other organic functional groups, such as amino, hydroxy, epoxy, ether, amido, and carboxyl groups. Thus, $R^4$ may have the formula $(R^3)_2N-$, $H(R^3)N-$, or $(R^3)_3N-$, wherein $R^3$ is independently a monovalent organic containing 1 to 30 carbon atoms. Alternatively, $R^3$ is independently a monovalent hydrocarbon group containing 1 to 30 carbon atoms, such as alkyl groups containing 1 to 30 carbons like methyl, ethyl, propyl, butyl, and similar homologs. Representative, non limiting examples include; $(CH_3)HN-$, $(CH_3)_2N-$, $(CH_3CH_2)HN-$, $(CH_3CH_2)_2N-$, $(CH_3CH_2)_3N-$, and $(HOCH_2CH_2)_2N-$. The amine functional group may include cyclic amines such as; pyrrolidine; piperidine; morpholine; 3-pyrrolidinol; 2,5-dimethylpyrrolidine; 1-methylpiperazine; 4-hydroxypiperidine; N-(2-hydroxyethyl)piperazine, 2,6-dimethylpiperidine; 1-ethylpiperazine; 1-amine-4-methylpiperazine; and isoindoline.

In a further embodiment, the organofunctional endblocking group E may have the formula,

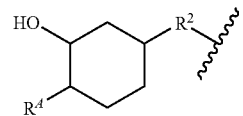

where $R^4$ and $R^2$ are the same as described above.

Representative, non-limiting, average formulas of the amine terminal silicone polyethers of the present disclosure are shown below;

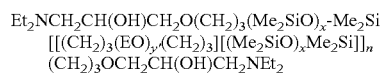

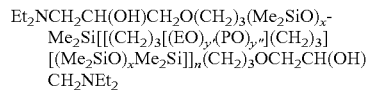

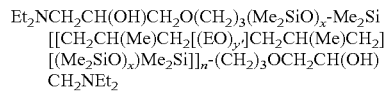

$Et_2NCH_2CH(OH)CH_2O(CH_2)_3(Me_2SiO)_x-Me_2Si[[CH_2CH(Me)CH_2[(EO)_{y'}(PO)_{y''}]CH_2CH(Me)CH_2][(Me_2SiO)_xMe_2Si]]_n-(CH_2)_3OCH_2CH(OH)CH_2NEt_2$ wherein n and x are as defined above,
y' is $\geq 0$, alternatively y' is 0 to 60,
y" is $\geq 0$, alternatively y" is 0 to 60,
with the proviso that y'+y"$\geq 4$
Me is methyl, Et is ethyl,
EO is $CH_2CH_2O$,
PO is $CH_2CH(Me)O$ or $CH_2CH_2CH_2O$.

In a further embodiment, the organofunctional endblocking group E is an epoxide functional group having the formula,

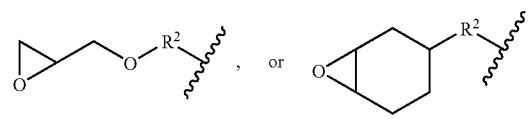

where $R^2$ is a divalent hydrocarbon linking group containing 2 to 6 carbon atoms, as described above. The epoxide functional silicone polyether block copolymers are particularly useful to prepare the amine terminal silicone polyether block copolymers of the present disclosure.

The present disclosure further provides a process to prepare an amine terminal silicone polyether block copolymer comprising:
I) reacting;
  A) a polyoxyalkylene having an unsaturated hydrocarbon group at each molecular terminal
  B) a SiH terminated organopolysiloxane,
  C) a hydrosilylation catalyst,
  D) an optional solvent,
    where the molar ratio of B/A is greater than one,
II) further reacting the product of step I with;
  E) an epoxide having at least one aliphatic unsaturated hydrocarbon group to form an epoxide terminal silicone polyether block copolymer,
III) reacting the epoxide terminal silicone polyether block copolymer with
  F) an amine compound
    to form the amine terminal silicone polyether block copolymer.

Step I) in the above process involves reacting ingredients A) a polyoxyalkylene having an unsaturated hydrocarbon group at each molecular terminal, B) a SiH terminated organopolysiloxane, C) a hydrosilylation catalyst, and D) an optional solvent, where the molar ratio of B/A is greater than one.

A) The Polyoxyalkylene

The polyoxyalkylene useful in the process of the present invention can be any polyoxyalkylene group that is terminated at each molecular chain end (i.e. alpha and omega positions) with a unsaturated organic group. The polyoxyalkylene may result from the polymerization of ethylene oxide, propylene oxide, butylene oxide, 1,2-epoxyhexane, 1,2-epoxyoctance, cyclic epoxides such as cyclohexene oxide or exo-2,3-epoxynorborane. Alternatively, the polyoxyalkylene may be represented by the formula $(C_mH_{2m}O)_y$, wherein m is from 2 to 4 inclusive, and y is greater than 4, alternatively y may range from 5 to 60, or alternatively from 5 to 30. The polyoxyalkylene group may comprise oxyethylene units ($C_2H_4O$), oxypropylene units ($C_3H_6O$), oxybutylene units ($C_4H_8O$), or mixtures thereof. Typically, the polyoxyalkylene group comprises oxyethylene units ($C_2H_4O$) or mixtures of oxyethylene units and oxypropylene units. The unsaturated organic group can be an unsaturated aliphatic hydrocarbon group such as alkenyl or alkynyl group. Representative, non-limiting examples of the alkenyl groups are shown by the following structures; $H_2C=CH-$, $H_2C=CHCH_2-$, $H_2C=C(CH_3)CH_2-$, $H_2C=CHCH_2CH_2-$, $H_2C=CHCH_2CH_2CH_2-$, and $H_2C=CHCH_2CH_2CH_2CH_2-$. Representative, non-limiting examples of alkynyl groups are shown by the following structures; $HC\equiv C-$, $HC\equiv CCH_2-$, $HC\equiv CC(CH_3)-$, $HC\equiv CC(CH_3)_2-$, and $HC\equiv CC(CH_3)_2CH_2-$. Alternatively, the unsaturated organic group can be an organofunctional hydrocarbon such as an acrylate, methacrylate and the like.

The polyoxyalkylene may be selected from those having the average formula

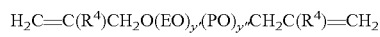

wherein y' is $\geq 1$, alternatively y' is 0 to 60,
  y" is $\geq 0$, alternatively y" is 0 to 60,
    with the proviso that y'+y"$\geq 4$
  $R^4$ is hydrogen or an alkyl group containing 1 to 20 carbon atoms,
  EO is $-CH_2CH_2O-$,
  PO is $-CH_2CH(Me)O-$ or $-CH_2CH_2CH_2O-$.

Polyoxyalkylenes having an unsaturated aliphatic hydrocarbon group at each molecular terminal are known in the art, and many are commercially available.

Representative, non-limiting examples of polyoxyalkylenes include;

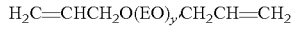

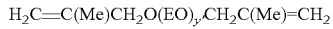

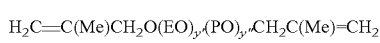

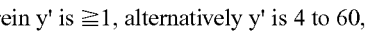

wherein y' is $\geq 1$, alternatively y' is 4 to 60,
  y" is $\geq 0$, alternatively y" is 0 to 60,
  Me is methyl,
  EO is $-CH_2CH_2O-$, and PO is $-CH_2CH(Me)O-$ or $-CH_2CH_2CH_2O-$.

Polyoxyalkylenes having an unsaturated aliphatic hydrocarbon group at each molecular terminal are commercially available from NOF (Nippon Oil and Fat, Tokyo, Japan) and Clariant Corp. (Charlottesville, N.C.).

B) The SiH Terminated Organopolysiloxane

The SiH terminated organopolysiloxanes useful in the process of the present invention can be represented by the formula M'DM', where "M'" means a siloxane unit of formula $R_2HSiO_{1/2}$, "D" means a siloxane unit of formula $R_2SiO_{2/2}$, where R is independently a monovalent hydrocarbon group as defined above. Typically, the SiH terminated organopolysiloxane is a dimethylhydrogensiloxy-terminated polydimethylsiloxane having the average formula $Me_2HSiO(Me_2SiO)_xSiHMe_2$, where x is $\geq 1$, alternatively x may range from 2 to 100, or from 2 to 50. SiH terminated organopolysiloxanes and methods for their preparation are well known in the art.

C) The Hydrosilylation Catalyst

The SiH terminated organopolysiloxane and polyoxyethylene having an unsaturated organic group at each molecular terminal are reacted in the presence of a hydrosilylation catalyst, which are known in the art. Hydrosilylations are well known in the art and involves the reaction between a polysiloxane containing $\equiv Si-H$ groups, and a material containing unsaturation, e.g., vinyl groups. The reaction typically uses a catalyst to effect the reaction between the $\equiv SiH$ containing polysiloxane and the material containing unsaturation. Suitable catalysts are Group VIII transition metals, i.e., the noble metals. Such noble metal catalysts are described in U.S. Pat. No. 3,923,705, incorporated herein by reference to show platinum catalysts. One preferred platinum catalyst is Karstedt's catalyst, which is described in Karstedt's U.S. Pat. Nos. 3,715,334 and 3,814,730, incorporated herein by reference. Karstedt's catalyst is a platinum divinyl tetramethyl disiloxane complex typically containing one weight percent of platinum in a solvent such as toluene. Another preferred platinum catalyst is a reaction product of chloroplatinic acid and an organosilicon compound containing terminal aliphatic unsaturation. It is described in U.S. Pat. No. 3,419,593, incorporated herein by reference. Most preferred as the catalyst is a neutralized complex of platinous chloride and divinyl tetramethyl disiloxane, for example as described in U.S. Pat. No. 5,175,325.

The noble metal catalyst can be used in an amount of from 0.00001-0.5 parts per 100 weight parts of the $\equiv SiH$ containing polysiloxane. Alternatively, the catalyst should be used in an amount sufficient to provide 0.1-15 parts per million (ppm) Pt metal per total composition.

D) The Optional Solvent

The hydrosilylation reaction can be conducted neat or in the presence of D), a solvent. The solvent can be an alcohol such as methanol, ethanol, isopropanol, butanol, or n-propanol, a ketone such as acetone, methylethyl ketone, or methyl isobutyl ketone; an aromatic hydrocarbon such as benzene, toluene, or xylene; an aliphatic hydrocarbon such as heptane, hexane, or octane; a glycol ether such as propylene glycol methyl ether, dipropylene glycol methyl ether, propylene glycol n-butyl ether, propylene glycol n-propyl ether, or ethylene glycol n-butyl ether, a halogenated hydrocarbon such as dichloromethane, 1,1,1-trichloroethane or methylene chloride, chloroform, dimethyl sulfoxide, dimethyl formamide, acetonitrile, tetrahydrofuran, white spirits, mineral spirits, or naphtha.

The amount of solvent can be up to 70 weight percent, but is typically from 20 to 50 weight percent, said weight percent being based on the total weight of components in the hydrosilylation reaction. The solvent used during the hydrosilylation reaction can be subsequently removed from the resulting silicone polyether by various known methods.

Step I) effects a hydrosilylation reaction, wherein the SiH units of ingredient B react with the unsaturated aliphatic hydrocarbon group of ingredient A to form an Si—C bond. The reaction may be conducted under those conditions known in the art for effecting hydrosilylations reactions.

Additional components can be added to the hydrosilylation reaction which are known to enhance such reactions. These components include salts such as sodium acetate which have a buffering effect in combination with platinum catalysts.

The amount of ingredients A and B used in step I may vary, providing the molar ratio of B/A is greater than 1, alternatively the molar ratio of B/A may vary from 1.05 to 2, alternatively from 1.2 to 2. Although, not wishing to be bound by any theory, the present inventors believe step I provides a reaction product comprising a silicone polyether $[AB]_n$ copolymer having terminal SiH units. These SiH units are further reacted in step II.

Step II) in the process of the present disclosure involves further reacting the product of step I with E) an epoxide having at least one aliphatic unsaturated hydrocarbon group to form an epoxide terminal silicone polyether block copolymer. The reaction in step II is another hydrosilylation reaction. Typically, the epoxide having at least one aliphatic unsaturated hydrocarbon group is simply added at the end of step I, and the second hydrosilylation reaction allowed to progress under the same conditions. Alternatively, additional amounts of the hydrosilylation catalyst C) may be added.

Representative, non-limiting examples of the epoxide having at least one aliphatic unsaturated group suitable for the reaction in step II include;
allyl glycidyl ether, CAS 106-92-3
vinylcyclohexene oxide, CAS 106-86-5
5,6-epoxy-1-hexene, (or 1,2-epoxy-5-hexene and 2-(3-butenyl)oxirane), CAS: 10353-53-4
9,10-epoxy-1 decene, (or 2-(7-octenyl)oxirane and 1,2-epoxy-9-decene) CAS: 85721-25-1
7,8-epoxy-1-octene, (or 1,2-epoxy-7-octene and 2-(5-hexenyl) oxirane) CAS: 19600-63-6
2-vinyloxirane, (or 3,4-epoxy-1-butene, butadiene monoxide) CAS: 930-22-3
2-methyl-2-vinyloxirane, (or Isoprene monoxide) CAS: 1838-94-4
Glycidyl acrylate, (or 2-oxiranylmethyl acrylate)
Glycidyl methacrylate, (or 2-oxiranylmethyl 2-methacrylate) CAS: 106-91-2
Limonene oxide, mixture of cis- and trans-, CAS: 1195-92-2)
Allyloxy-3,4-epoxytricyclo(5.2.1.0 2,6)decane, CAS: 2279-19-8.

The amount of the epoxide added in step II may vary, but is typically added in sufficient amount to consume the residual Si—H, that is a molar excess of epoxide to SiH is used. Lower amounts of the epoxide may be used if limiting free epoxide is desired, with the understanding that only partial endblocking will be achieved.

Step I) and Step II) may be carried out sequentially or simultaneously; however typically the reactions are conducted sequentially to build molecular weight of the $(AB)_n$ before consuming the final quantities of Si—H with an excess of the epoxy endcapping group.

Step III) in the process of the present disclosure involves reacting the epoxide terminal silicone polyether block copolymer formed in step II) with F) an amine compound to form the amine terminal silicone polyether block copolymer. Step III effects a ring opening reaction of the epoxide by the addition of an amine compound.

The amine compound may be any amine compound, but typically are secondary amines. The amine compound may be selected from an amine compound containing an $R^A$ group, where $R^A$ is as defined above. Thus, $R^A$ may have the formula $(R^3)_2N$—, $H(R^3)N$—, or $(R^3)_3N$—, wherein $R^3$ is independently a monovalent organic containing 1 to 30 carbon atoms. Alternatively, $R^3$ is independently a monovalent hydrocarbon group containing 1 to 30 carbon atoms, such as alkyl groups containing 1 to 30 carbons like methyl, ethyl, propyl, butyl, and similar homologs. The amine compound may include other organic functional groups, such as amino, hydroxy, epoxy, ether, amido, and carboxyl groups. Representative, non limiting examples include; $(CH_3)NH_2$, $(CH_3)_2NH$, $(CH_3CH_2)NH_2$, $(CH_3CH_2)_2NH$, $(CH_3CH_2)_3N$, $(HOCH_2CH_2)_2NH$.

The amine functional group may include cyclic amines. Representative non-limiting examples of suitable cyclic amines include;
1-(2-hydroxyethyl)piperazine
Pyrrolidine, CAS: 123-75-1
Piperidine, CAS: 110-89-4
Morpholine, CAS: 110-91-8
3-Pyrrolidinol, CAS: 40499-83-0
2,5-dimethylpyrrolidine, CAS: 3378-71-0
1-methylpiperazine, CAS: 109-01-3
4-hydroxypiperidine, CAS: 5382-16-1
2,6-dimethylpiperidine, CAS: 504-03-0
1-ethylpiperazine, CAS: 5308-25-8
1-amine-4-methylpiperazine, CAS: 6928-85-4
Isoindoline, CAS: 496-12-8

A representative, non-limiting, reaction scheme is shown below indicating the method of the present disclosure.

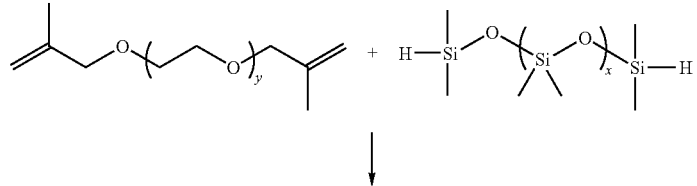

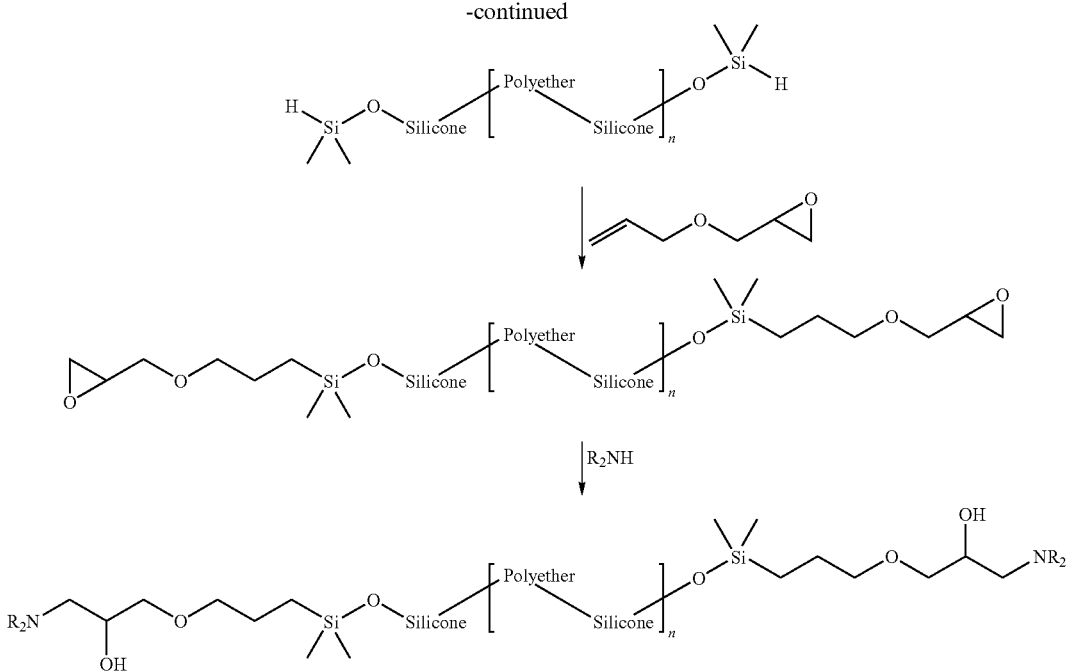

The amine terminal silicone polyether block copolymer of the present disclosure may be further reacted to form amine salts or quaternary ammonium salts. For example, the amine terminal silicone polyether block copolymer may be reacted with alkyl halides or alkyl sulfates to form a quaternary ammonium salt. The reaction may occur under those conditions known in the art for effecting quaternization of amines. It is not necessary to convert all the amine groups present in the amine terminal silicone polyether block copolymer. Thus, those silicone polyether block copolymers having a mixture of amine and quaternary groups are considered to be within the compositions of the present invention.

The amine or quat terminal silicone polyether block copolymers of the present disclosure may be an ingredient in an emulsion composition. As used herein, "emulsion" is meant to encompass water continuous emulsions (for example an oil in water type emulsion, or a silicone in water emulsion), oil or silicone continuous emulsions (water in oil emulsions or water in silicone emulsions), or multiple emulsions (water/oil/water, oil/water/oil types, water/silicone/water, or silicone/water/silicone). The amine or quat terminal silicone polyether block copolymers of the present disclosure may be added to any type of emulsion by common mixing techniques. The addition the amine or quat terminal silicone polyether block copolymers may occur either during the preparation of the emulsion, or subsequently post added to a pre-formed emulsion. There are no special requirements or conditions needed to effect the mixing of amine or quat terminal silicone polyether block copolymers of the present disclosure and the emulsion. Mixing techniques can be simple stirring, homogenizing, sonalating, and other mixing techniques known in the art to effect the formation of emulsions. The mixing can be conducted in a batch, semi-continuous, or continuous process.

The amount of amine or quat terminal silicone polyether block copolymers of the present disclosure added to the emulsion can vary and is not limited, however the amounts typically may range from a silicone polyether copolymer/emulsion weight ratio of 0.1/99 to 99/0.1, alternatively 1/99 to 99/1.

The emulsions used may be w/o, w/s, or multiple phase emulsions using silicone emulsifiers. Typically the water-in-silicone emulsifier in such formulation is non-ionic and is selected from polyoxyalkylene-substituted silicones, silicone alkanolamides, silicone esters and silicone glycosides. Silicone-based surfactants may be used to form such emulsions and are well known in the art, and have been described for example in U.S. Pat. No. 4,122,029 (Gee et al.), U.S. Pat. No. 5,387,417 (Rentsch), and U.S. Pat. No. 5,811,487 (Schulz et al).

When the emulsion is an oil-in-water emulsion, it may include common ingredients generally used for preparing emulsions such as but not limited to non ionic surfactants well known in the art to prepare o/w emulsions. Examples of nonionic surfactants include polyoxyethylene alkyl ethers, polyoxyethylene alkylphenol ethers, polyoxyethylene lauryl ethers, polyoxyethylene sorbitan monoleates, polyoxyethylene alkyl esters, polyoxyethylene sorbitan alkyl esters, polyethylene glycol, polypropylene glycol, diethylene glycol, ethoxylated trimethylnonanols, and polyoxyalkylene glycol modified polysiloxane surfactants.

The method of the present invention comprises applying to fibers or textiles the silicone block copolymer or emulsions thereof, either of which are also referred herein as the treatment composition. The amount applied is a "hand improving" effective amount of the treatment composition and is applied to the fiber and/or textile by any convenient method. Hand for purposes of the invention means the softness and smoothness of the fabric. For example, the treatment composition can be applied by padding, dipping, spraying or exhausting. When the treatment composition comprises more than one solution, dispersion, or emulsion; the solutions, dispersions, and emulsions can be applied simultaneously or sequentially to the textiles. After the treatment composition is applied to the fiber and/or fabric, it can be dried by heat.

The fiber/textile treatment composition can be applied to the fiber and/or textile during making the fibers or textiles, or later such as during laundering textiles. After application, carriers (if any) can be removed from the treatment composition for example by drying the composition at ambient or elevated temperature. The amount of treatment composition applied to the fibers and textiles is typically sufficient to provide 0.1 to 15 weight percent of the composition on the fibers and textiles, based on their dry weight, preferably in an amount of 0.2 to 5 weight percent based on the dry weight of the fiber or textile.

Fibers and textiles that can be treated with the treatment composition include natural fibers such as cotton, silk, linen, and wool; regenerated fibers such as rayon and acetate; synthetic fibers such as polyesters, polyamides, polyacrylonitriles, polyethylenes, and polypropylenes; combinations, and blends thereof. The form of the fibers can include threads, filaments, tows, yarns, woven fabrics, knitted materials, non-woven materials, paper, carpet, and leather. Textiles treated with the silicone block copolymer have a feel or hand comparable to conventional hydrophobic silicone, but do not significantly impact negatively on the hydrophilicity of the textile.

EXAMPLES

These examples are intended to illustrate the invention to one of ordinary skill in the art and should not be interpreted as limiting the scope of the invention set forth in the claims. All measurements and experiments were conducted at 23° C., unless indicated otherwise.

Materials

The following is a listing of the materials used as used in these examples.

Si—H Polymers

Si—H terminal silicone=a polysiloxane of average formula Me$_2$HSiO(Me$_2$SiO)$_x$SiHMe$_2$ where x=the average degree of polymerization (DP), as noted in the examples.

Polyethers

POLYETHER 1=a bis-methallyl terminated polyether, MW=1276.0 g/mol, having the average formula H$_2$C=C(Me)CH$_2$O(EO)$_{24}$CH$_2$C(Me)=CH$_2$ POLYETHER 2=a bis-methallyl terminated polyether, MW=787 g/mol, having the average formula H$_2$C=C(Me)CH$_2$O(EO)$_{15}$CH$_2$C(Me)=CH$_2$ POLYETHER 3=a bis-methallyl terminated polyether, MW=1590 g/mol, having the average formula H$_2$C=C(Me)CH$_2$O(EO)$_{24}$(PO)$_7$CH$_2$C(Me)=CH$_2$ Hydrosilylation Catalyst SYL-OFF 4000 (0.52wt % Pt), used as supplied (Dow Corning Corporation, Midland Mich.).

Example 1

Preparation of an Epoxy Terminal Silicone-Polyether Block Copolymer

To a 500 mL 3-neck flask was added 28.5 g (32.3 mmol) of POLYETHER 2, 0.661 g of SYL-OFF 4000 Catalyst (0.517 wt % Pt), and 66.7 g of toluene. To the flask was affixed a Claisen adaptor, reflux condenser, thermometer adapter, and addition funnel. The headspace was purged with N$_2$ for five minutes and the mixture was then heated to 70° C. A total of 67.8 g of an Si—H terminal silicone (96.8 mmol of H as Si—H) was added slowly. An exotherm was observed and once it subsided, the reaction mixture was heated to 130° C. Upon complete addition of the Si—H terminal silicone, 3.69 g (32.3 mmol) of allyl glycidyl ether was added slowly. The reaction was then allowed to continue heating for four hours. After cooling, the solvent and volatiles were removed in vacuo. The structure of the resulting copolymer was confirmed by NMR and GPC.

Example 2

Preparation of an Epoxy Terminal Silicone-Polyether Block Copolymer

To a 250 mL 3-neck flask was added 8.58 g (11.5 mmol) of POLYETHER 2, 0.145 g of 4000 SYL-OFF 4000 Catalyst (0.517 wt % Pt), and 14.0 g of i-PrOH. To the flask was affixed a Claisen adaptor, reflux condenser, thermometer adapter, and addition funnel. The headspace was purged with N$_2$ for five minutes and the mixture was then heated to 70° C. A total of 115 g of Si—H terminal silicone (34.4 mmol of H as Si—H) was added slowly. An exotherm was observed and once it subsided, the reaction was heated to 85° C. One hour after complete addition of the Si—H terminal silicone, 3.69 g (13.1 mmol) of allyl glycidyl ether was added slowly. The reaction was then allowed to continue heating for three hours. After cooling, the solvent and volatiles were removed in vacuo. The structure of the resulting copolymer was confirmed by NMR and GPC.

Example 3

Preparation of Amine Terminal Silicone-Polyether Block Copolymer

To a 250 mL 3-neck flask was added 50.0 (8.07 mmol) of the diepoxy terminal (AB)$_n$ copolymer of Example 1. Then, 5.00 g (68.4 mmol) of diethylamine and 20.0 g of i-PrOH were weighed into the flask. After purging the headspace with N$_2$ for five minutes, the mixture was heated overnight at 50° C. After cooling, the solvent and volatiles were removed in vacuo. $^{13}$C NMR confirmed reaction of the epoxide to form the amine terminal block copolymer.

Example 4

Preparation of Amine Terminal Silicone-Polyether Block Copolymer

To a 250 mL 3-neck flask was added 75.3 (3.46 mmol) of the diepoxy terminal (AB)$_n$ copolymer of Example 2. Then, 0.95 g (9.03 mmol) of 1-(2-hydroxyethyl)piperazine and 32.9 g of i-PrOH were weighed into the flask. After purging the headspace with N$_2$ for five minutes, the mixture was heated at reflux for four hours. After cooling, the solvent and volatiles were removed in vacuo. $^{13}$C NMR confirmed reaction of the epoxide to form the amine terminal block copolymer.

Example 5

Preparation of Amine Terminal Silicone-Polyether Block Copolymer

Using the experimental procedures as described in Examples 1-4, additional representative amine terminal silicone-polyether block copolymers were prepared, as summarized in Table 1.

TABLE 1

| (AB)$_n$ Silicone-Polyether Block Copolymers | | | | | | | |
|---|---|---|---|---|---|---|---|
| Silicone DP | Ratio | Polyether DP | n | Amine* | Silicone (wt. %) | EO (wt. %) | Nitrogen (wt. %) |
| 18 | — | 17 | 2 | DEA | 65.2 | 24.6 | 0.394 |
| 32 | — | 26 | 2 | DEA | 70.5 | 22.9 | 0.279 |
| 37 | — | 26 | 2 | DEA | 73.2 | 20.7 | 0.252 |
| 45 | — | 26 | 2 | DEA | 77.2 | 18.0 | 0.219 |
| 37 | — | 26 | 2 | MEA | 73.7 | 20.6 | 0.251 |

TABLE 1-continued (AB)$_n$ Silicone-Polyether Block Copolymers

| Silicone DP | Ratio | Polyether DP | n | Amine* | Silicone (wt. %) | EO (wt. %) | Nitrogen (wt. %) |
|---|---|---|---|---|---|---|---|
| 32 | — | 26 | 2 | HEP | 70.0 | 22.7 | 0.554 |
| 32 | — | 17 | 2 | HEP | 75.8 | 16.2 | 0.600 |
| 65, 7.4 | 1:3.8 | 17 | 2 | HEP | 66.7 | 22.4 | 0.828 |
| 65, 7.4 | 2:3 | 17 | 4 | HEP | 74.4 | 19.3 | 0.357 |
| 47, 7.4 | 2:3 | 17 | 4 | HEP | 69.4 | 23.0 | 0.426 |
| 47 | — | 17 | 2 | HEP | 82.2 | 11.9 | 0.441 |
| 47 | — | 26 | 2 | DEA | 84.8 | 10.0 | 0.228 |
| 47 | — | 14 | 2 | DEA | 84.8 | 10.1 | 0.228 |
| 47 | — | 14 | 4 | DEA | 83.8 | 12.0 | 0.135 |
| 47 | — | 14 | 6 | DEA | 83.4 | 12.7 | 0.096 |
| 47 | — | 14 | 8 | DEA | 83.2 | 13.2 | 0.074 |
| 47 | — | 14 | 2 | HEP | 84.0 | 10.0 | 0.451 |
| 47 | — | 14 | 4 | HEP | 83.4 | 11.9 | 0.268 |
| 47 | — | 14 | 6 | HEP | 83.1 | 12.7 | 0.191 |
| 47 | — | 14 | 8 | HEP | 82.9 | 13.1 | 0.148 |
| 90 | — | 14 | 2 | HEP | 91.0 | 5.6 | 0.254 |
| 35 | — | 14 | 2 | HEP | 79.4 | 12.9 | 0.291 |
| 35 | — | 14 | 4 | HEP | 78.6 | 15.3 | 0.173 |
| 35 | — | 14 | 6 | HEP | 78.2 | 16.3 | 0.123 |
| 35 | — | 14 | 2 | JEFF | 66.6 | 23.1 | 0.244 |
| 35 | — | 14 | 2 | OCT | 77.1 | 12.5 | 0.283 |
| 34 | — | 23, 6 | 2 | DEA | 69.1 | 18.3 | 0.257 |
| 35 | — | 23, 6 | 2 | DEA | 69.5 | 18.1 | 0.255 |
| 45 | — | 23, 6 | 2 | DEA | 74.6 | 15.1 | 0.212 |
| 53 | — | 23, 6 | 2 | DEA | 77.9 | 13.2 | 0.185 |
| 18 | — | 14 | 4 | DEA | 66.5 | 24.8 | 0.279 |
| 34 | — | 19, 39 | 2 | DEA | 52.5 | 11.7 | 0.196 |
| 45 | — | 19, 39 | 2 | DEA | 59.2 | 10.1 | 0.168 |
| 53 | — | 19, 39 | 2 | DEA | 63.5 | 9.03 | 0.150 |
| 34 | — | 26 | 2 | DEA | 71.3 | 22.9 | 0.249 |
| 45 | — | 26 | 2 | DEA | 76.5 | 18.9 | 0.204 |
| 53 | — | 26 | 2 | DEA | 79.6 | 16.3 | 0.177 |

Amine* abbreviations =
DEA: diethylamine,
MEA: N-methylethanolamine (CAS: 109-89-7),
JEFF: Jeffamine M-1000 (CAS: 83713-01-3),
OCT: Octadecylamine (CAS: 124-30-1), and
HEP: 1-(2-hydroxyethyl)piperazine (CAS: 103-76-4)

Example 6

Quaterization of an Amine Terminal Silicone-Polyether Block Copolymer

An amine terminate silicone polyether block copolymer having the target composition EB(AB)$_n$E, where n=2, A represents a 17 DP polyether block, B represents a 45 DP silicone block, and E arises from hydroxyethylpiperazine, was subjected to quaternization with dimethylsulfate, as described in this example. Theoretical nitrogen content was 0.44 wt. % N or 0.314 meq/g amine. The quaternization was targeted to convert 45% of the nitrogen groups to quaternary ammonium groups.

To a 4 neck 100 mL flask outfitted with a condenser, stirrer, temperature controller and $N_2$ bubbler was added 40.05 g of the amine terminated silicone polyether block copolymer (12.6 meq amine), 7.6 g i-PrOH, and 0.81 g (6.4 mmol) $Me_2SO_4$. The flask was purged with $N_2$ and then held under static nitrogen for 3 hours at reflux. The flask was allowed to cool, and then 7.16 g of butyl carbitol was added. The mixture was vacuum stripped to 85° C. and less than 6 mm pressure. Theoretical amine content of the butyl carbitol solution was 0.262 meq/g. Theoretical quat content of the butyl carbitol solution was 0.134 meq/g.

Surfactant titration of an aqueous dispersion of the product under basic conditions with sodium laurel sulfate solution confirmed the presence of quaternary ammonium groups.

Example 7

Emulsification of an Amine Terminal (AB)$_n$.

An amine terminated silicone polyether block copolymer having the target composition EB(AB)$_n$E, where n=2, A represents a 14.1 DP polyether block, B represents a 34.5 DP silicone block, and E arises from reaction with diethylamine was emulsified as follows.

To a 2 liter stainless steel beaker was added 125.17 g amine terminated silicone polyether block copolymer, 22.39 g GENAPOL UD 050 (Clariant Corporation, Charlottesville N.C.), 43.88 g GENAPOL UD110, and 1.56 g acetic acid. The surfactants, polymer and acid were mixed for 5 minutes at 500 RPM using a combination of a Cowles blade and an impeller having six 45° blades. To that mixture was added 24.40 g water and the mixer was turned on an additional 5 minutes. Another 5.90 g of water was added, and thickening was immediately apparent. The mixer was then turned on for 30 minutes. It was necessary to stop the mixer periodically to scrap down the walls and the blades. Another 302.82 g water was added and the mixer was turned on for an additional 3 hours. It was noted that the mixture became very thick. The final addition of water was 100.67 g, and the mixer was turned on for an additional 1.5 hours. Analysis of the emulsion using the Nanotrac Particle Size Analyzer showed the emulsion to have $M_v$=0.0903 micrometers and $M_n$=0.0350 micrometers.

Example 8

Testing on Fabric

Samples of the amine terminal (AB)n materials were emulsified and applied on cotton knit fabric for evaluation. As summarized in Table 2, samples of the amine terminal silicone significantly improved the feel of the fabric as shown by panel testing. Control samples treated with water typically had very poor hand, and received a rating of 1. Samples treated with the (AB)$_n$ polymers of the current invention were rated above 4.5, indicative of a significant improvement. The hydrophilicity and yellowing characteristics of the fabric were not affected to a great extent.

TABLE 2

Performance of Amine Terminal (AB)$_n$ Silicone Polyethers on Cotton Knit

| | | | Absorbency (sec) | | Whiteness Index | | Hand |
|---|---|---|---|---|---|---|---|
| Sample | Silicone (wt. %) | N (wt. %) | after drying | After 160° C./10 min | after drying | after 160° C./10 min | Rating Scale (1-5) |
| Control | | | 0.84 | 0.65 | 79.9 | 59.8 | 1 |
| A | 75.6 | 0.25 | 2.26 | 3.15 | 79.8 | 59.8 | 4.6 |
| B | 79.8 | 0.22 | 2.81 | 3.31 | 80.0 | 58.6 | 4.9 |

Example 9

Preparation of Silicone-Polyether Block Copolymers with Internal and Terminal Amine Groups Using the experimental procedures described in Examples 1 and 2, an epoxy terminal silicone polyether block copolymer was prepared from POLYETHER 2, a silicone having 0.183 wt. % H as terminal SiH, and allyl glycidyl ether (AGE) using a mole ratio of unsaturation from the polyether: H from SiH: unsaturation from the AGE of 1:2:1.38. The resulting copolymer was stripped to remove excess AGE resulting in a copolymer having a viscosity of 171 cP and an epoxide content of 0.662 meq epoxide/g.

A series of reactions were carried out between the epoxy terminal silicone and butyl amine in which the mole ratio of amine to epoxide was varied. As each primary amine is capable of reacting twice with epoxide, the molecular weight, and thus the viscosity of the product should decrease as the amine concentration is increased to favor endblocking. Excesses of primary amine minimize chain extension, and thus lead to lower viscosity products. Table 3 summarizes the effect of the amine/epoxy ratio on the viscosity of the block copolymers prepared from an epoxy terminal $(AB)_n$ having 0.662 meq epoxide/g and butylamine.

TABLE 3

| Amine/Epoxy (mol/mol) | Product Viscosity (cP) | Comment |
| --- | --- | --- |
| 0.000 | 171 | Starting Epoxy Terminal (AB)n |
| 3.750 | 414 | Large excess of amine |
| 0.760 | 1,410 | |
| 0.618 | 6,610 | |
| 0.565 | 11,400 | |
| 0.526 | 11,400 | |

$^{13}$C NMR confirms the presence of chain extending and terminal amine groups. A peak at 49.3 ppm in the $^{13}$C NMR spectrum was assigned to a methylene group alpha to the terminal amine nitrogen, whereas a peak at 54.97 ppm was assigned to a methylene group alpha to a chain extending amine nitrogen. Residual epoxide was observed at lower amine/epoxy ratios, but the epoxide could be eliminated by adding excess amine near the end of the reaction.

Example 10

Preparation of Chain-Extended Amine Terminal Silicone-Polyether Block Copolymer with a Diamine An epoxy terminal $(AB)_n$ silicone polyether copolymer was synthesized with POLYETHER 2, an Si—H terminal silicone (0.061 wt % H as SiH) and allyl glycidyl ether to give a copolymer having a viscosity of 1650 cP and an epoxide content of 0.214 meq/g. To a 250 mL 3-neck flask was added 75.1 g (16.0 meq epoxide) of the above polymer, 1.54 g (17.9 mmol) of piperazine (CAS: 110-85-0), and 32.9 g of i-PrOH. The reaction was heated at reflux for six hours. After cooling, the solvent was removed in vacuo. Viscosity measurements (cone and plate) showed that the viscosities of the epoxy terminal polymer relative to that of the resulting polymer increased from 1650 cP to 7130 cP. NMR analysis confirms that the average molecular weight is twice that of the starting epoxy terminal polymer.

The invention claimed is:

1. A silicone polyether copolymer having the average formula;

where E is an organofunctional endblocking group having the formula $R^4CH_2CH(OH)CH_2OR^2$, or

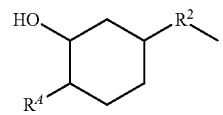

where $R^4$ is a monovalent amine functional group and $R^2$ is a divalent hydrocarbon linking group containing 2 to 6 carbon atoms,
B is a diorganopolysiloxane,
A is a divalent organic group comprising at least one polyether group, and
n is $\geq 1$.

2. The silicone polyether copolymer of claim 1 wherein the silicone polyether copolymer has the average formula;

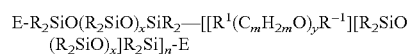

x is $\geq 0$, m is from 2 to 4 inclusive, y is $\geq 4$, n is $\geq 1$,
R is independently a monovalent hydrocarbon group containing 1 to 30 carbons,
$R^1$ is a divalent hydrocarbon containing 2 to 30 carbons.

3. The silicone polyether copolymer of claim 1 wherein $R^4$ has the formula $(R^3)_2N$—, $H(R^3)N$—, or $(R^3)_3N$—, wherein $R^3$ is independently a monovalent organic containing 1 to 30 carbon atoms.

4. The silicone polyether copolymer of claim 3 wherein $R^4$ is $(CH_3CH_2)_2N$—.

5. The silicone polyether copolymer of claim 1 where the $R^4$ amine functional group is a cyclic amine.

6. The silicone polyether copolymer of claim 5 where the cyclic amine is 1-(2-hydroxyethyl)piperazine.

7. The silicone polyether copolymer of claim 1 wherein the organofunctional endblocking group E has the formula $R^QCH_2CH(OH)CH_2OR^2$— where
$R^Q$ is a monovalent quaternary ammonium functional group,
$R^2$ is a divalent hydrocarbon linking group containing 2 to 6 carbon atoms.

8. An emulsion comprising the silicone polyether block copolymer of claim 1.

9. A method comprising treating a textile or fibers with the emulsion of claim 8.

10. A method comprising treating a textile or fibers with the silicone block copolymer of claim 1.

11. A process to prepare a silicone polyether block copolymer comprising:
I) reacting;
A) a polyoxyalkylene having an unsaturated hydrocarbon group at each molecular terminal
B) a SiH terminated organopolysiloxane,
C) a hydrosilylation catalyst,
D) an optional solvent,
where the molar ratio of B/A is greater than one,
II) further reacting the product of step I with;
E) an epoxide having at least one aliphatic unsaturated hydrocarbon group
to form an epoxide terminal silicone polyether block copolymer, III) reacting the epoxide terminal silicone polyether block copolymer with
F) an amine compound
to form an amine terminal silicone polyether block copolymer.

12. The process of claim 11 wherein A) the polyoxyalkylene has the average formula

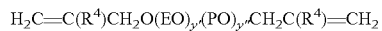

wherein y' is ≧1, alternatively y' is 0 to 60,
y" is ≧0, alternatively y" is 0 to 60,
with the proviso that y'+y"≧4
$R^4$ is hydrogen or an alkyl group containing 1 to 20 carbon atoms,
EO is —$CH_2CH_2O$—,
PO is —$CH_2CH(Me)O$— or —$CH_2CH_2CH_2O$—.

13. The process of claim 11 wherein B) the SiH terminated organopolysiloxane has the average formula $Me_2HSiO(Me_2SiO)_xSiHMe_2$ where x is ≧1.

14. The process of claim 13 wherein x ranges from 2 to 100.

15. The process of claim 11 wherein the epoxide is allyl glycidyl ether or vinylcyclohexene oxide.

16. The process of claim 11 wherein the amine compound is selected from diethylamine, N-methylethanolamine, or 1-(2-hydroxyethyl)piperazine.

17. The process of claim 11 further comprising;
IV) quaternizing the amine terminal silicone polyether block copolymer to form a quaternary ammonium salt terminal silicone polyether block copolymer.

18. The silicone polyether block copolymer prepared by the method according to claim 11.

* * * * *